United States Patent
Samuni et al.

(10) Patent No.: US 11,204,333 B2
(45) Date of Patent: Dec. 21, 2021

(54) METHOD AND SYSTEM FOR AUTOMATIC DETECTION OF INEFFICIENT HOUSEHOLD THERMAL INSULATION

(71) Applicant: GRID4C, Tel-Aviv (IL)

(72) Inventors: Eran Samuni, Giv'atayim (IL); Alexander Zak, Jerusalem (IL); Noa Rimini, Ra'anana (IL)

(73) Assignee: GRID4C, Tel Aviv (IL)

( * ) Notice: Subject to any disclaimer, the term of this patent is extended or adjusted under 35 U.S.C. 154(b) by 76 days.

(21) Appl. No.: 16/633,221

(22) PCT Filed: Jul. 24, 2018

(86) PCT No.: PCT/IL2018/050820
§ 371 (c)(1),
(2) Date: Jan. 23, 2020

(87) PCT Pub. No.: WO2019/021280
PCT Pub. Date: Jan. 31, 2019

(65) Prior Publication Data
US 2020/0191736 A1 Jun. 18, 2020

Related U.S. Application Data

(60) Provisional application No. 62/536,064, filed on Jul. 24, 2017.

(51) Int. Cl.
*G01N 25/00* (2006.01)
*F24F 11/30* (2018.01)

(52) U.S. Cl.
CPC .............. *G01N 25/00* (2013.01); *F24F 11/30* (2018.01)

(58) Field of Classification Search
CPC ................................. G01N 25/00; F24F 11/30
See application file for complete search history.

(56) References Cited

U.S. PATENT DOCUMENTS

10,281,896 B1 * 5/2019 Goodman ................ F24F 11/30
2014/0074730 A1 3/2014 Arensmeier et al.
(Continued)

*Primary Examiner* — Alexander Satanovsky
*Assistant Examiner* — Lynda Dinh
(74) *Attorney, Agent, or Firm* — Browdy and Neimark, P.L.L.C.

(57) ABSTRACT

A system for automatic detection of inefficient household thermal insulation includes a server module and a plurality of household client modules. The system performs the following steps: acquiring data relating to each monitored household; identifying periods of HVAC down-time and determining indoor temperature gained during these periods; extracting parameters of temperature gain, relating to the measured rate of temperature gain during the down time; training a machine learning algorithm, to create at least one classification model, wherein all monitored households are classified according to the parameters of temperature gain; producing expected values for parameters of temperature gain per each household, according to household's class membership; producing the ratio between the expected and measured values for parameters of temperature gain per each monitored household; comparing the ratio among similar households; and identifying inefficiently insulated household according to the comparison.

13 Claims, 7 Drawing Sheets

(56) References Cited

U.S. PATENT DOCUMENTS

| | | | |
|---|---|---|---|
| 2014/0277765 A1* | 9/2014 | Karimi | G05B 15/02 |
| | | | 700/276 |
| 2015/0057810 A1 | 2/2015 | Smith et al. | |
| 2015/0332294 A1* | 11/2015 | Albert | G06Q 30/0202 |
| | | | 705/7.31 |
| 2016/0356515 A1* | 12/2016 | Carter | F24F 11/30 |
| 2016/0377305 A1* | 12/2016 | Kwa | F24F 11/30 |
| | | | 700/277 |
| 2017/0023272 A1* | 1/2017 | Erickson | F24F 11/30 |

\* cited by examiner

Fig. 1

Data accumulation module 1100

| |
|---|
| Acquiring at least one of the following per each monitored HVAC from the HVAC agent module [2100]: 1110<br>1. Indoor temperature at the location on the thermostat<br>2. HVAC compressor activation time;<br>3. HVAC thermostat convenience temperature settings; and<br>4. HVAC mode of operation (i.e. cooling \ heating). |
| Acquiring indoor and outdoor temperature per each household from the environmental measurement module [2200]. 1120<br>Optionally acquiring outdoor temperature per each household from external sources, e.g. online weather services. |
| Acquiring from the client configuration module [2300] household-specific resident's profile parameters (e.g. number of inhabitants, household occupancy throughout the day etc.). 1130 |
| Acquiring from the client configuration module [2300] household-specific profile parameters (e.g. age, location and size) 1140<br>Optionally acquiring household-specific profile parameters from external sources. |
| Optionally acquiring regular household-level power consumption readings from a smart power meter 1150 |

Fig. 2

Preprocessing module 1200

Acquiring data from the data accumulation module, including at least one of:
1. HVAC compressor activation time;
2. HVAC mode of operation (i.e. cooling \ heating);
3. HVAC thermostat convenience temperature settings;
4. Indoor and outdoor temperature; and
5. Household power consumption.
1210

Optionally apply an analysis algorithm, to identifying the existence of an unmonitored HVAC system within the monitored household. Said HVAC is henceforth referred to as a 'ghost' HVAC.
1220

Identifying periods of HVAC down-time, directly following HVAC compressor turn-off, during which the indoor temperature has risen by a predefined temperature (e.g. 1.5 Deg Fahrenheit).
1225

Determining each household's "Period to Gain Predefined Temperature" (PGPT), i.e.: the period it took the indoor temperature to gain the predefined temperature
1230

Identifying periods of HVAC down-time, while the HVAC compressor is turned off, exceeding a predefined period (e.g. 5 minutes).
1235

Determining each household's "Temperature Gained during Predefined Period" (TGPP), i.e.: the indoor temperature gained within the said predefined period
1240

Fig. 3

PGPT Training module 1300

Obtaining at least part of the following data in respect to each monitored household:
- Time of day;
- The "Period to Gain Predefined Temperature" (PGPT) (from the preprocessing module);
- Indoor and outdoor temperature (from the data accumulation module);
- HVAC compressor activation time (from the data accumulation module);
- HVAC thermostat convenience temperature settings;
- HVAC mode of operation (i.e. cooling \ heating);
- The household profile parameters (from the data accumulation module);
- Residents' profile parameters (from the data accumulation module);
- Ghost HVAC Indication

1310

Training a machine learning algorithm in relation to all monitored households according to the said obtained data, thus creating the "PGPT classification model". This model classifies households according to PGPT, i.e. the time it takes the indoor temperature to rise by the predefined number of Fahrenheit degrees.

1320

Using the PGPT classification model to produce per each household a "expected PGPT" parameter, according to the household's profile parameters and residents' profile parameters.

1330

Said expected PGPT reflects the expected time it would take the indoor temperature to rise by the predefined number of Fahrenheit degrees, given the current environmental conditions (e.g.: outdoor temperature, time of day).

Fig. 4

TGPP Training module 1400

Obtaining at least part of the following data in respect to each monitored household:
- Time of day;
- The "Temperature Gained during Predefined Period" (TGPP) (from the preprocessing module);
- Indoor and outdoor temperature (from the data accumulation module);
- HVAC compressor activation time (from the data accumulation module);
- HVAC thermostat convenience temperature settings;
- HVAC mode of operation (i.e. cooling \ heating);
- The household profile parameters (from the data accumulation module );
- Residents' profile parameters (from the data accumulation module); and
- Ghost HVAC indication

1410

Training a machine learning algorithm in relation to all monitored households according to the said obtained data, thus creating the "TGPP classification model". This model classifies households according to TGPP, i.e. the measured rise of indoor temperature during a predefined period after the HVAC compressor had been switched off.

1420

Using the TGPP classification model to produce per each household a "expected TGPP" parameter, according to the household's profile parameters and residents' profile parameters.

1430

Said expected TGPP reflects the expected rise of indoor temperature (in Fahrenheit degrees) during a predefined period, while the HVAC compressor is turned off, given the current environmental conditions (e.g.: outdoor temperature, time of day).

Fig. 5

Data analysis module 1500

- Obtaining at least part of the following data in respect to each monitored household: 1510
  - The "Period to Gain Predefined Temperature" (PGPT) (from the preprocessing module);
  - The Prediction PGPT (from the PGPT Training module 1300);
  - The "Temperature Gained during Predefined Period" (TGPP) (from the preprocessing module); and
  - The expected TGPP (from the TGPP Training module 1400)

- Dividing the actual PGPT (from the preprocessing module) by the expected PGPT (from the PGPT Training module 1300), per each monitored household. The quotient of this division is henceforth referred to as the household's "PGPT scoring ratio". 1520

- Comparing the PGPT scoring ratio of each household with that of its peers (i.e. houses of similar profile parameters and residents profile parameters). Low PGPT scoring ratio (i.e. households that have gained the predefined temperature quicker than expected) in relation to peers may indicate a condition of inferior insulation. 1530

- Dividing the actual TGPP (from the preprocessing module) by the expected TGPP (from the TGPP Training module 1400), per each monitored household. The quotient of this division is henceforth referred to as the household's "TGPP scoring ratio". 1540

- Comparing the TGPP scoring ratio of each household with that of its peers (i.e. houses of similar profile parameters and residents profile parameters). High TGPP scoring ratio (i.e. households that have gained more heat than expected during a predefined period) in relation to peers may indicate a condition of inferior insulation. 1550

- Analyze said comparisons, to identify conditions of suspected poor household insulation 1560

- Optionally produce alerts to administrators and end users, notifying them of said suspected conditions of poor insulation 1570

Fig. 8

METHOD AND SYSTEM FOR AUTOMATIC DETECTION OF INEFFICIENT HOUSEHOLD THERMAL INSULATION

CROSS-REFERENCE TO RELATED APPLICATIONS

This application is a national phase application of PCT application no. PCT/IL2018/050820, filed Jul. 24, 2018, which claims the benefit of U.S. provisional application No. 62/536,064, filed Jul. 24, 2017.

FIELD OF THE INVENTION

The invention generally relates to the field of monitoring electronic appliances, and particularly to the field of automatic detection of inefficient household thermal insulation.

BACKGROUND ART

The utilization of smart electric power consumption meters for household-level power consumption monitoring is ubiquitous in several developed countries. Smart power meters facilitate an efficient platform for remotely monitoring power consumption in near-real time, and control power consumption billing on a household scale.

The data conveyed by the smart power meters implicitly incorporates information regarding specific household's power consumption trends, conditions of malfunction, and insight to household power consumption efficiency.

SUMMARY OF INVENTION

The present invention discloses a method for automatic detection of inefficient household thermal insulation within a group of monitored households, implemented by a server module and a plurality of household client modules, wherein each of said a server module and plurality of household client modules comprising one or more processors, operatively coupled to non-transitory computer readable storage devices, on which are stored modules of instruction code, wherein execution of said instruction code by said one or more processors implements the following actions:
  acquiring data relating to each monitored household, including at least part of: environmental conditions, HVAC compressor activation time, HVAC thermostat convenience temperature settings, indoor and outdoor temperatures, household profile parameters, and household residents' profile parameters;
  identifying periods of HVAC down-time, and determining the indoor temperature gained during these periods;
  extracting parameters of temperature gain, relating to the measured rate of temperature gain during the said down time;
  training a machine learning algorithm, to create at least one classification model, wherein all monitored households are classified according to said acquired data and parameters of temperature gain during said identified periods of HVAC down-time;
  using the at least one classification model to produce expected values for parameters of temperature gain per each household, according to the household's class membership;
  producing the ratio between said expected values for parameters of temperature gain and measured values of parameters of temperature gain per each monitored household;
  comparing said ratio per each monitored household with those of its peers; and
  determining, according to the said comparison, whether a specific household is suspected to be inefficiently insulated.

According to some embodiments, the said method further comprises the step of identifying the existence of an active unmonitored HVAC system within a monitored household.

According to some embodiments, one of said extracted parameters of temperature gain, relating to the measured rate of indoor temperature gain during the said down time is the Period to Gain a Predefined Temperature difference (PGPT).

According to some embodiments, one of said extracted parameters of temperature gain, relating to the measured rate of indoor temperature gain during the said down time is the Temperature Difference Gained during Predefined Period" (TGPP).

The present invention further discloses a system for automatic detection of inefficient household thermal insulation within a group of monitored households, comprising a server module and a plurality of household client modules, wherein:
  each of said a server module and plurality of household client modules comprising one or more processors, operatively coupled to non-transitory computer readable storage devices, on which are stored modules of instruction code, wherein execution of said instruction code by said one or more processors implements the function of the said server and client modules;
  said plurality of household client modules [200] are configured to acquire at least part of: indoor temperature, outdoor temperature, HVAC compressor activation time, HVAC thermostat convenience temperature settings, HVAC mode of operation, household profile parameters and household residents' profile parameters;
  said plurality of household client modules [200] are configured to convey said acquired data to the server module [100];
  said server module [100] further comprises a preprocessor module [1200], configured to identify periods of HVAC down-time, and determine the indoor temperature gained during these periods of HVAC down-time;
  said preprocessor module 1200 is further configured to extract parameters of temperature gain, relating to the measured rate of indoor temperature gain during the said down time;
  said server module 100 further comprises at least one training module [1300, 1400], configured to train a machine learning algorithm, to create at least one classification model, wherein all monitored households are classified according to said acquired data and parameters of temperature gain;
  the said at least one training modules [1300, 1400] are further configured to use the at least one classification model to produce expected values for parameters of temperature gain per each household, according to the household's class membership;
  said server module 100 further comprises a data analysis module [1500], configured to produce the ratio between said expected values for parameters of temperature gain and measured values of parameters of temperature gain per each monitored household;
  said data analysis module [1500] is further configured to compare said ratio per each monitored household with those of its peers; and said data analysis module [1500] is further configured to determine, according to the said comparison, whether a specific household is suspected to be inefficiently insulated.

According to some embodiments, the said preprocessor module [1200] is further configured to extract indications regarding the existence of an unmonitored active HVAC system within a monitored household.

According to some embodiments of the said e system, one of said extracted parameters of temperature gain, relating to the measured rate of indoor temperature gain during the said down time is the Period to Gain a Predefined Temperature (PGPT).

According to some embodiments of the said e system, one of said extracted parameters of temperature gain, relating to the measured rate of indoor temperature gain during the said down time is the Temperature Gained during Predefined Period (TGPP).

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 6 is a flow diagram depicting the functionality of the data analysis module 1500, according to some embodiments of the present invention. This module resides within the server, and is responsible for ascertaining whether a specific household is suspected to be inefficiently isolated.

FIGS. 7a and 7b are graphs of empirical measurements, depicting the dependency of the indoor temperature over time on the outdoor temperatures and HVAC temperature convenience settings. FIG. 7a presents the indoor temperature of a poorly insulated household, whereas FIG. 7b presents the indoor temperature of a household bearing solid thermal insulation.

MODES FOR CARRYING OUT THE INVENTION

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| Server module | A module implemented by one or more processors operatively coupled to a non-transitory computer readable storage device, on which are stored modules of instruction code, wherein execution of the said instruction code by the one or more processors implements at least part of tire following server functions: accumulating data from a plurality of monitored households and monitored HVAC systems installed therein; analyzing said accumulated data; and alerting against conditions of suspected inefficient thermal insulation. |
| Household client module | A module implemented by one or more processors operatively coupled to a non-transitory computer readable storage device, on which are stored modules of instruction code, wherein execution of the said instruction code by the one or more processors implements at least part of the following functions: interfacing the server module; and conveying data pertaining to specific monitored household and monitored HVAC systems installed therein. |
| Household | A set of parameters relating to each household, including at least one of: |

-continued

| Term | Definition |
| --- | --- |
| profile parameters | house type (e.g. flat, duplex house etc.), size (area and volume), age, geographic location and regional climate, physical location (e.g. top story, south-facing or north-facing). |
| Residents profile parameters | A set of parameters relating to the residents of each household, including at least one of: Number of residents, type of residents (e.g. family, married couple, roommates), lifestyle (i.e. how often they occupy the household) |
| Period to Gain Predefined Temperature (PGPT) | PGPT is an indicator of insulation efficiency, denoting the rate at which a household gains heat, i.e. the time it takes its indoor temperature to rise by a predefined number of degrees, when the HVAC system is off. |
| Expected PGPT | The PGPT that is expected according to the household's cluster membership |
| PGPT scoring ratio | The quotient of dividing the actual measured PGPT by the expected PGPT. Low PGPT scoring ratio (i.e. households that have gained the predefined temperature quicker than expected) in relation to household peers may indicate a condition of inefficient insulation. |
| Temperature Gained during Predefined Period (TGPP) | TGPP is an indicator of insulation efficiency, denoting the indoor temperature gained during a predefined period, when the HVAC is turned off. |
| Expected TGPP | The TGPP that is expected according to the household's cluster membership. |
| TGPP scoring ratio | The quotient of dividing the actual measured TGPP by the expected TGPP. High TGPP scoring ratio (i.e. households that have gained more heat than expected during a predefined period) in relation to peers may indicate a condition of inefficient insulation. |

Figure 1:
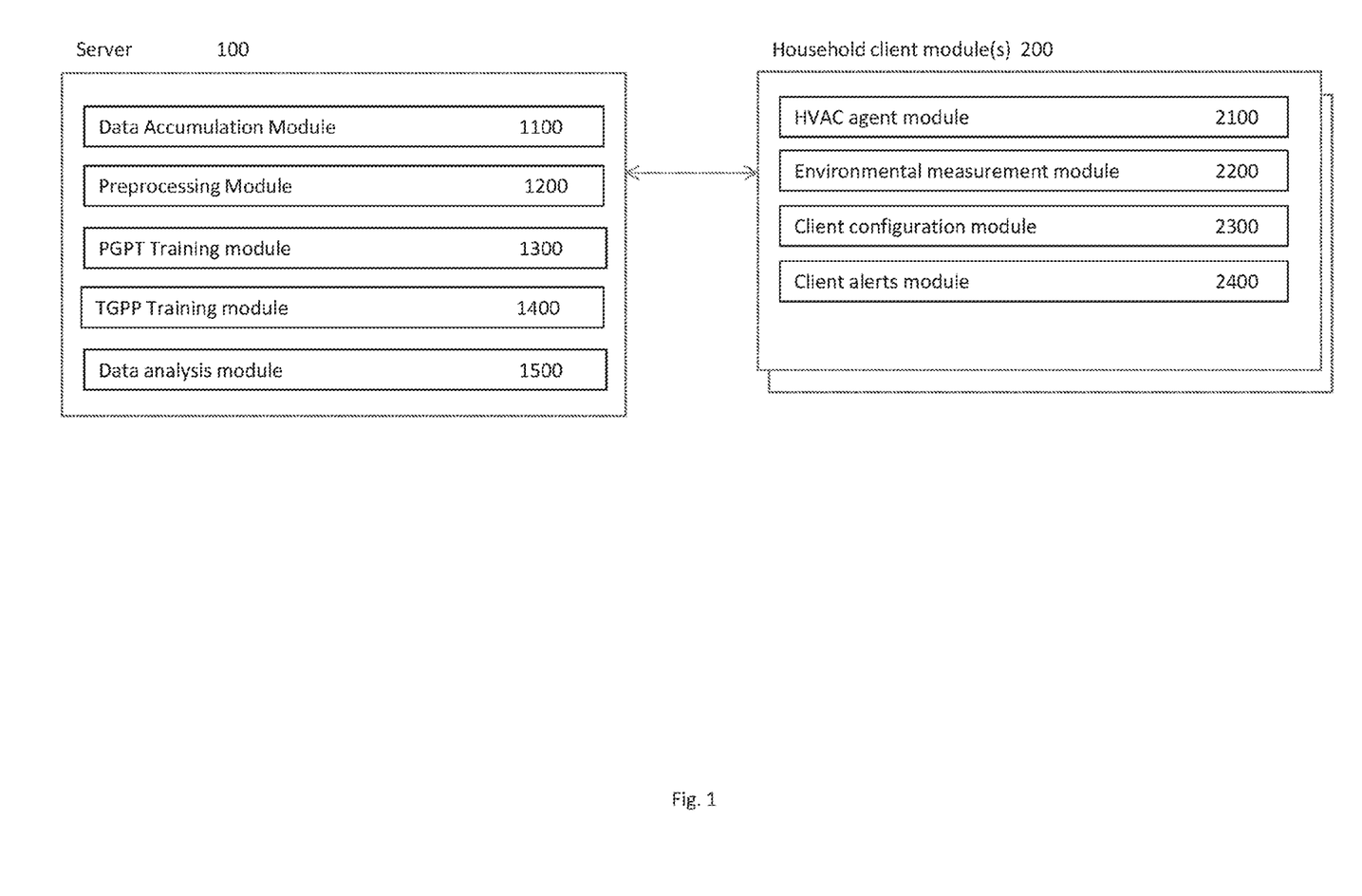
FIG. 1 is a block diagram, depicting a high level overview of the proposed system, wherein a plurality of client modules extract data pertaining to specific households and HVAC systems, and propagate said data to a main server according to some embodiments of the present invention.

FIG. 1 is a block diagram, depicting a high level overview of the proposed system, wherein a plurality of client modules extract information pertaining to specific monitored households and monitored HVAC systems installed therein, and propagate this data to a main server according to some embodiments of the present invention.

The household client 200 is a module implemented in software or hardware or any combination thereof, installed at the location of monitored households.

The household client module 200 is configured to interface the server module 100 using any type of wired or wireless data communication standard (e.g. LAN, WAN, WiFi, GSM, 3GPP, LTE etc.), and convey to the server 100 data pertaining to a specific household. This data includes at least one of: the household's properties, concurrent temperature measurements, and data relating to HVAC systems installed therein.

The household client module 200 is comprised of at least one of the following sub modules:
HVAC agent module 2100,
Environmental measurement module 2200,
Client configuration module 2300, and
Client alerts module 2400.

The HVAC agent module 2100, acquires data relating to at least one of:
HVAC compressor activation time;
HVAC thermostat convenience temperature settings;
and HVAC mode of operation (i.e. cooling heating).

The environmental measurement module 2200 acquires concurrent indoor and outdoor temperature.

The client configuration module 2300 provides an interface for introducing household-specific parameters. These parameters include at least one of:
the household profile parameters (e.g. age, location and size, etc.); and
the household's residents' profile parameters (e.g. number of residents, household occupancy throughout the day, etc.).

The client alerts module 2400 provides an interface for receiving alerts regarding conditions of suspected inefficient thermal insulation.

According to some embodiments, the client configuration module 2300 acquires regular (e.g. in a resolution of 15 minutes) household-level power consumption readings from a smart household power meter.

The server 100 is a module implemented in software or hardware or any combination thereof, configured to interface a plurality of household client modules 200 which are installed at the location of monitored households.

According to some embodiments, the server module 100 also communicates with an administrative client module (not shown), which provides an administrative interface for system configuration, emittance of real-time alerts, and production of historical reports.

The server module includes several sub modules, configured to accumulate data, analyze the data, and ascertain whether specific households are inefficiently insulated. The said sub-modules include at least one of the following:
The data accumulation module 1100;
The data preprocessing module 1200;
The PGPT training module 1300;
The TGPP training module 1400; and
The data analysis module 1500.

The data accumulation module 1100 accumulates real-time data from the plurality of household client modules, and stores it in a database for further processing, said data including at least one of:
HVAC compressor activation time;
HVAC thermostat convenience temperature settings;
HVAC mode of operation (i.e. cooling heating);
Household indoor and outdoor temperature;
HVAC properties (e.g.: make, model, nominal power consumption);
Household profile parameters (e.g.: size, location, climate); and
Household residents' profile parameters.

The data preprocessing module 1200 applies various algorithms on the said accumulated real-time data, to produce at least one of the following household-specific parameters:

"Period to Gain Predefined Temperature" (PGPT), i.e. the period it took the indoor temperature to gain the predefined temperature, directly following HVAC compressor turn-off; and "Temperature Gained during Predefined Period" (TGPP), i.e.: The indoor temperature gained within a predefined period, while the HVAC compressor is turned off.

The PGPT training module 1300 applies machine learning algorithms on the acquired data, to produce the household-specific "Expected PGPT" parameter, i.e.: the expected time it would take the indoor temperature to rise by the predefined number of Fahrenheit degrees, given the current environmental conditions.

The TGPP training module 1400 applies machine learning algorithms on the acquired data, to produce the household-specific "Expected TGPP" parameter, i.e.: the expected rise of indoor temperature during a predefined period, while the HVAC compressor is turned off given the current environmental conditions.

The data analysis module 1500 analyzes at least part of the said household-specific parameters (i.e. PGPT, TGPP, Expected PGPT and Expected TGPP), identifies conditions of suspected inefficient household insulation, and optionally alerts users and administrators against the said suspected condition.

Figure 2:
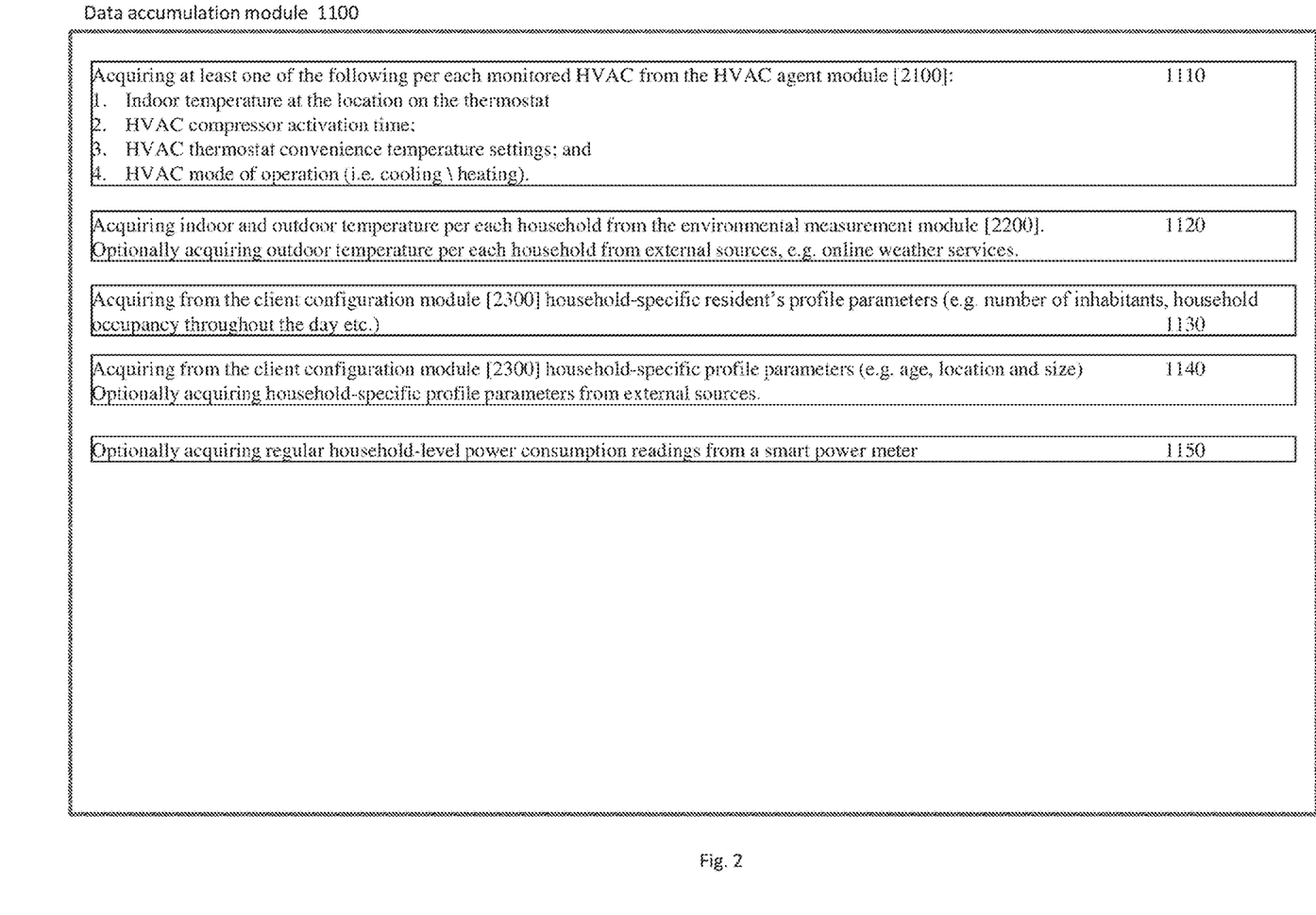
FIG. 2 is a flow diagram, depicting the function of the data accumulation module according to some embodiments of the present invention. This module resides within the server, and is configured to accumulate household-specific data.

FIG. 2 is a flow diagram, depicting the function of the data accumulation module 1100 according to some embodiments of the present invention. This module resides within the server 100, and accumulates data from the plurality of household client modules, pertaining to specific households. According to one embodiment, the data accumulation module 1100 stores said accumulated data in a database for further analysis. Said accumulated data includes at least one of the following:

Data acquired by the from HVAC agent modules [2100], pertaining to monitored HVACs installed within monitored households (step 1110). This data includes at least one of: HVAC compressor activation time, HVAC thermostat convenience temperature settings, HVAC mode of operation (i.e. cooling heating), and indoor temperature at the location of the HVAC thermostat;

Indoor and outdoor temperature per each monitored household, as acquired by the environmental measurement module [2200] (step 1120). According to one embodiment, the said indoor and outdoor temperature may be acquired by respective sensors, physically located at the household's location. According to another embodiment, the outdoor temperature may be acquired elsewhere, e.g. from online weather services;

Monitored household specific residents' profile parameters (e.g. number of residents, and household occupancy during the day) as acquired by the client configuration module [2300](step 1130);

Monitored household specific profile parameters (e.g.: house size, type, location, age, geographic location and climate) as acquired by the client configuration module [2300] or from external sources (e.g. aerial or satellite photographs, online web sites, municipal databases etc.) (step 1140).

According to some embodiments, the data accumulation module 1100 acquires regular (e.g. in a resolution of 15 minutes) household-level power consumption readings from a smart household power meter.

Figure 3:
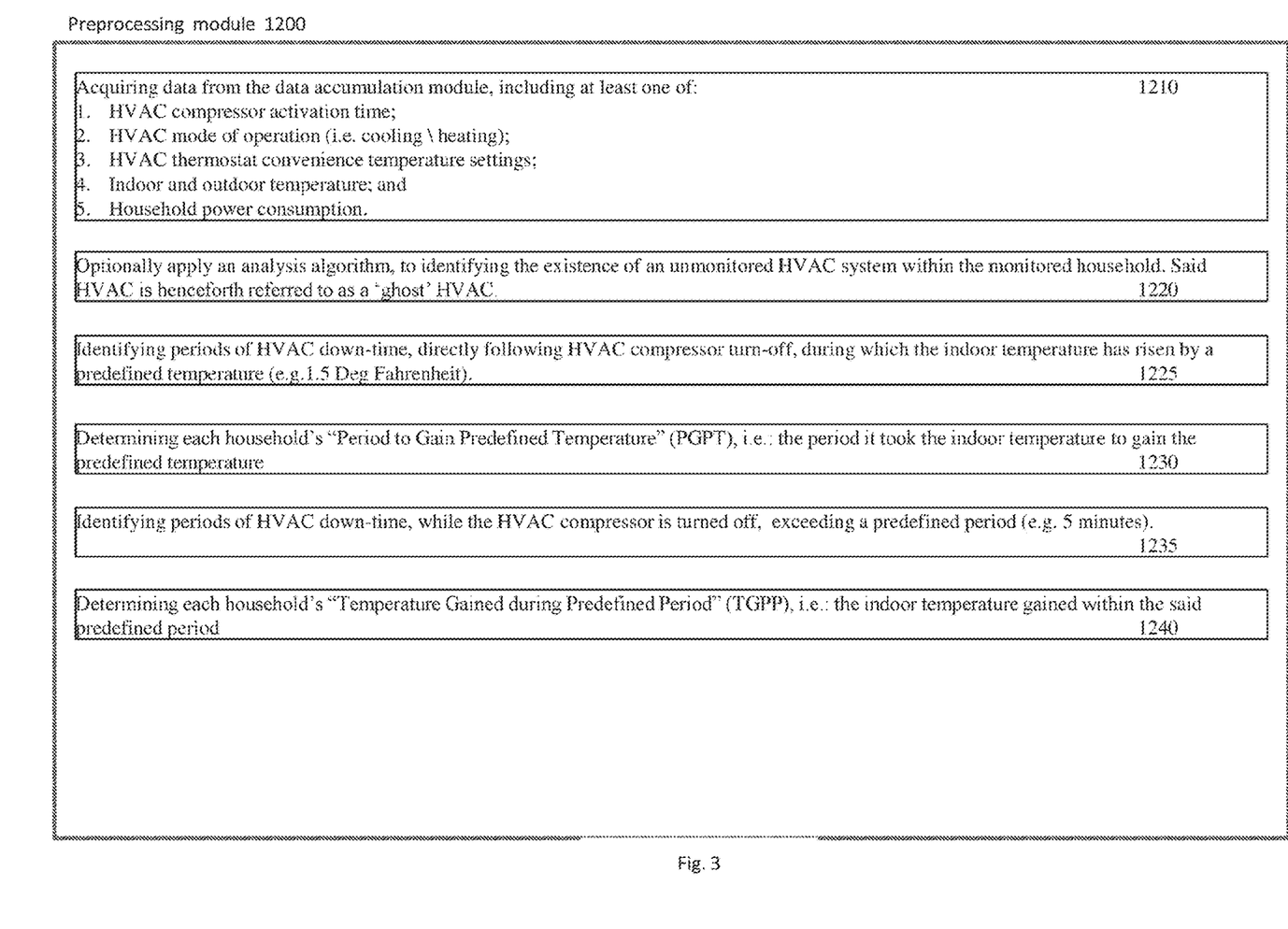
FIG. 3 is a flow diagram, depicting the function of the data preprocessing module according to some embodiments of the present invention. This module resides within the server, and is extracting the "Period to Gain Predefined Temperature" (PGPT) and "Temperature Gained during Predefined Period" (TGPP) parameters.

FIG. 3 is a flow diagram, depicting the function of the data preprocessing module 1200 according to some embodiments of the present invention. This module resides within the server, and is extracting the "Period to Gain Predefined Temperature" (PGPT) and "Temperature Gained during Predefined Period" (TGPP) parameters.

The preprocessing module 1200 acquires data from the data accumulation module (step 1210). Said data including at least one of:
HVAC compressor activation time;
HVAC mode of operation (i.e. cooling\heating);
HVAC thermostat convenience temperature settings;
Indoor and outdoor temperature; and
Household power consumption.

According to some embodiments, the preprocessing module 1200 is configured to apply an analysis algorithm to the said acquired data, and identify the existence of active, unmonitored HVAC systems within a monitored household (step 1220). Such HVAC systems are hereby referred to as 'Ghost' HVACs.

The following is an example for such an analysis algorithm, applied by the preprocessing module 1200, to produce an indication for existence of a ghost HVAC system:
a. the preprocessing module 1200 identifies a period within which the monitored HVAC's compressor has been inactive;
b. the preprocessing module 1200 identifies a decline in the monitored household's indoor temperature within said period; and
c. the preprocessing module 1200 identifies a household power consumption pattern that is conclusive with the activation of an HVAC system.
d. the preprocessing module 1200 analyzes the combination of the said identified data, and produces an indication for existence of a ghost HVAC system. This indication is henceforth referred to as the "Ghost HVAC Indication".
e. according to some embodiments, the ghost HVAC indication includes at least one of:
the level of certainty of ghost HVAC existence (e.g. how decisive are the measurement of indoor temperature decline, and how conclusive is the identification of an HVAC operation in the measured household power consumption); and
the effect of the suspected ghost HVAC on the household's temperature (e.g. a strong HVAC within a small house may obscure the system's assessment of insulation efficiency).

The preprocessing module 1200 identifies periods of HVAC down-time, and determines the indoor temperature gained during these periods. It extracts at least two kinds of parameters (PGPT, TGPP) relating to the rate of temperature gain during the said down time, as elaborated below.

The preprocessing module 1200 identifies periods of HVAC down-time, directly following HVAC compressor turn-off, during which the indoor temperature has risen by a predefined temperature (e.g. 1.5 Deg. Fahrenheit) (step 1225). The period it took the indoor temperature to gain the predefined temperature is henceforth referred to as the "Period to Gain Predefined Temperature" (PGPT).

Figure 7A:
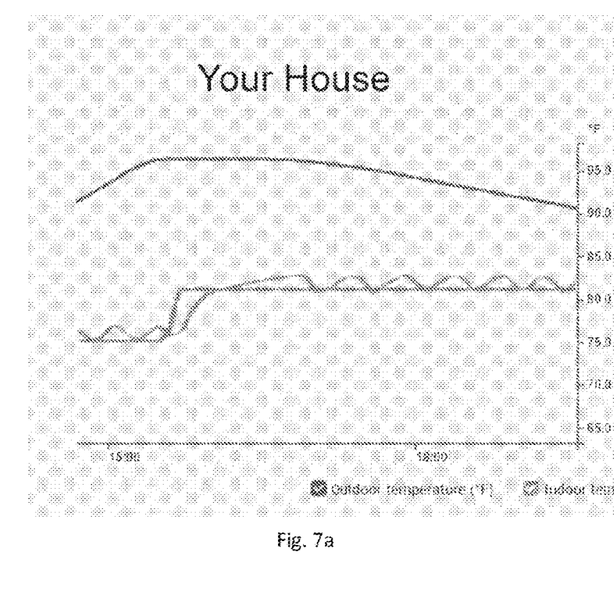
Figure 7B:
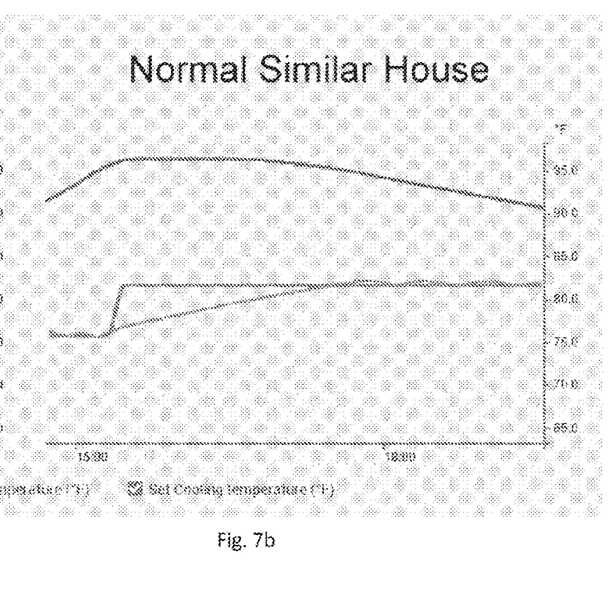

Reference is now made to FIGS. 7a and 7b. Both figures portray a saw-tooth pattern of indoor temperature behaviour after 18:00. In FIG. 7a the saw-tooth pattern is quite apparent, whereas that of FIG. 7b is more subtle. This observation indicates that the Period to Gain Predefined Temperature (PGPT) for FIG. 7a is shorter than that of 7b, implying that the thermal insulation of FIG. 7a is inferior to that of FIG. 7b.

The preprocessing module 1200 determines each monitored household's PGT (step 1230).

The preprocessing module 1200 identifies periods of HVAC down-time while the HVAC compressor is turned off, exceeding a predefined period (e.g. 5 minutes) (step 1235). The indoor temperature gained within the said predefined period is henceforth referred to as the "Temperature Gained during Predefined Period" (TGPP).

Reference is again made to FIGS. 7a and 7b. Both figures portray a condition in which the set convenience temperature on the HVAC thermostat was increased shortly after 15:00. This increase has caused the HVAC to become inactive, turning its compressor off. The indoor temperature gradually increased in both cases, until it reached the new convenience temperature setting. It is apparent that this increase of indoor temperature was quite abrupt in FIG. 7a, whereas a more moderate increase is displayed in FIG. 7b. This observation indicates that the Temperature Gained during Predefined Period (TGPP) is higher in the case of FIG. 7a than in that of FIG. 7b. This again implies that the thermal insulation of FIG. 7a is inferior to that of FIG. 7b.

The preprocessing module 1200 determines each monitored household's TGPP (step 1240).

Figure 4:
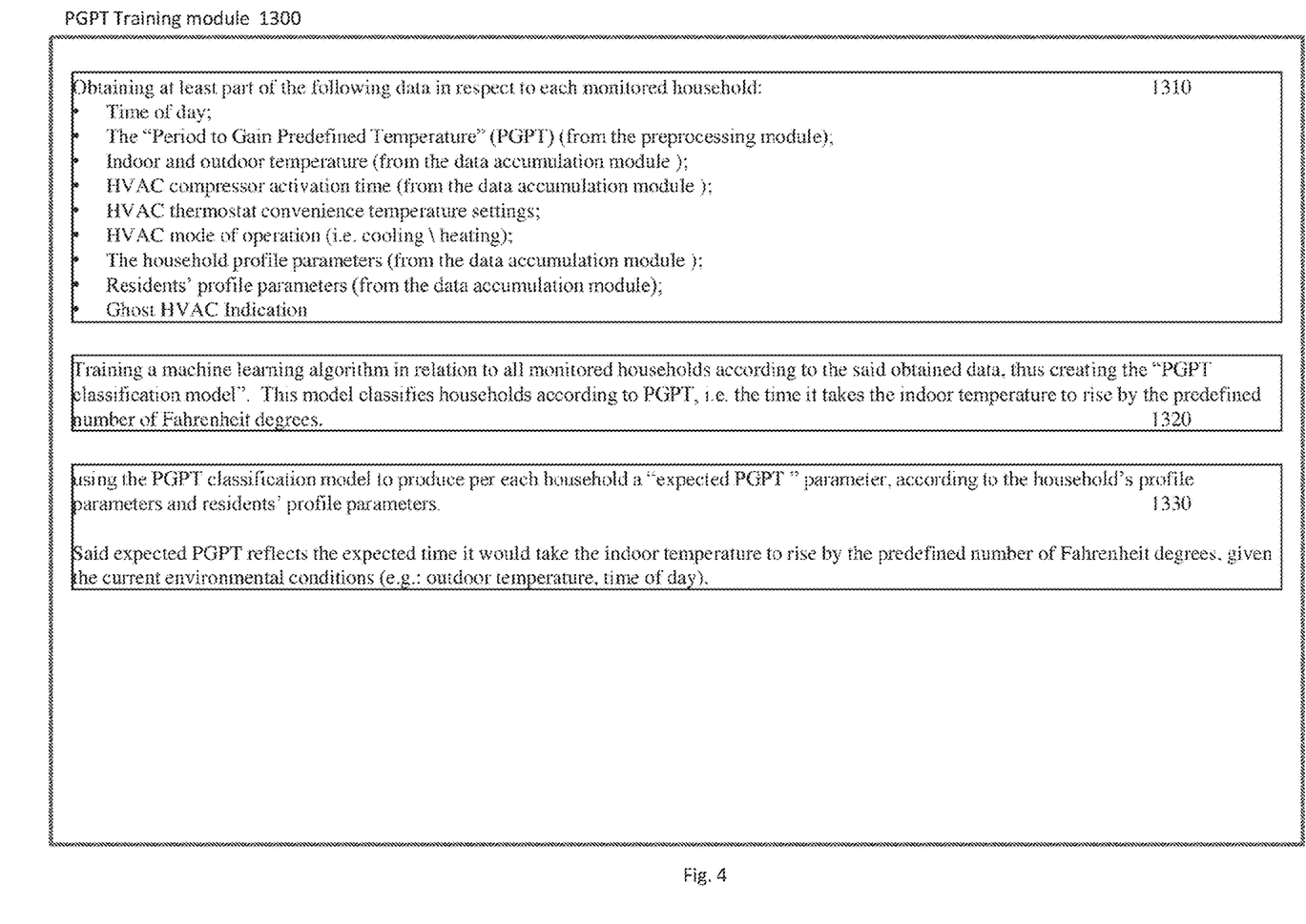
FIG. 4 is a flow diagram depicting the functionality of the PGPT Training module, according to some embodiments of the present invention. This module resides within the server, and is responsible for extracting the household-specific "Expected PGPT" parameter.

FIG. 4 is a flow diagram depicting the functionality of the PGPT Training module 1300, according to some embodiments of the present invention. This module resides within the server, and is responsible for extracting the household-specific "Expected PGPT" parameter.

the PGPT Training module 1300 obtains at least part of the following data in respect to each monitored household and monitored HVAC installed therein (step 1310):
  Time of day;
  The "Period to Gain Predefined Temperature" (PGPT) (from the preprocessing module);
  Indoor and outdoor temperature (from the data accumulation module);
  HVAC compressor activation time (from the data accumulation module);
  HVAC thermostat convenience temperature settings (from the data accumulation module);
  HVAC mode of operation (i.e. cooling heating) (from the data accumulation module);
  The household profile parameters (from the data accumulation module);
  Residents' profile parameters (from the data accumulation module); and
  Ghost HVAC indication.

The PGPT Training module 1300 trains a machine learning algorithm in relation to all monitored households, according to the said obtained data, thus creating the "PGPT classification model" (step 1320). This model classifies households according to PGPT, i.e. according to the time it takes the indoor temperature to rise by the predefined number of Fahrenheit degrees.

The PGPT Training module 1300 produces per each household a "Expected PGPT" parameter according to the PGPT classification model (step 1330). Said expected PGPT parameter reflects the expected time it would take the indoor temperature to rise by the predefined number of Fahrenheit degrees, given the current environmental conditions (e.g.: current time of day and outdoor temperature).

Figure 5:
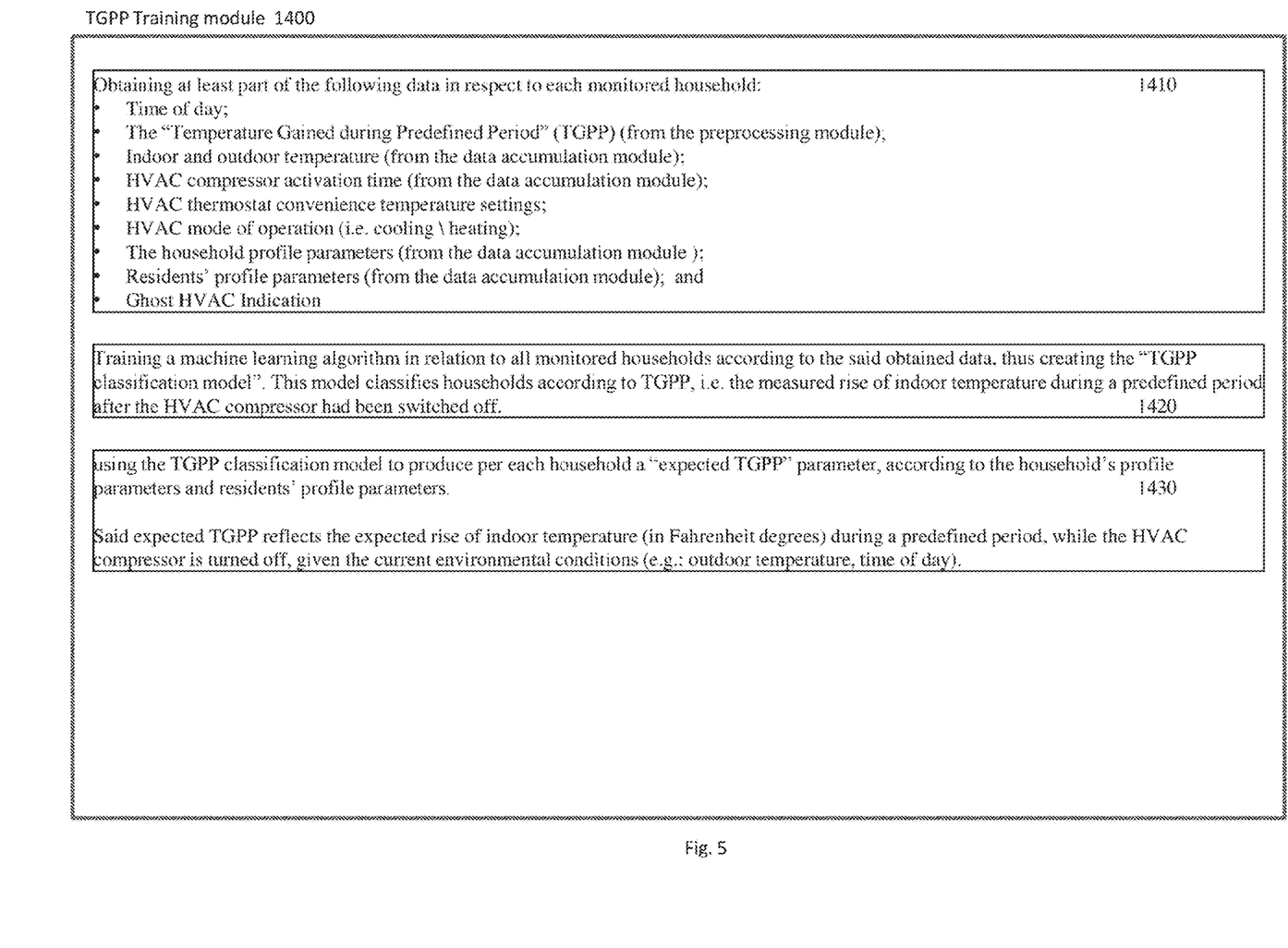
FIG. 5 is a flow diagram depicting the functionality of the TGPP Training module, according to some embodiments of the present invention. This module resides within the server, and is responsible for extracting the household-specific "Expected TGPP" parameter.

FIG. 5 is a flow diagram depicting the functionality of the TGPP Training module, according to some embodiments of the present invention. This module resides within the server, and is responsible for extracting the household-specific "Expected TGPP" parameter.

The TGPP Training module 1400 obtains at least part of the following data in respect to each monitored household and monitored HVAC installed therein (step 1410):
  Time of day;
  The "Temperature Gained during Predefined Period" (TGPP) (from the preprocessing module);
  Indoor and outdoor temperature (from the data accumulation module);
  HVAC compressor activation time (from the data accumulation module);
  HVAC thermostat convenience temperature settings (from the data accumulation module);
  HVAC mode of operation (i.e. cooling heating) (from the data accumulation module);
  The household profile parameters (from the data accumulation module);
  Residents' profile parameters (from the data accumulation module); and
  Ghost HVAC indication.

The TGPP Training module 1400 trains a machine learning algorithm in relation to all monitored households, according to the said obtained data, thus creating the "TGPP classification model" (step 1420). This model classifies households according to TGPP, i.e. the measured rise of indoor temperature during a predefined period after the HVAC compressor had been switched off.

The TGPP Training module 1400 produces per each household a "Expected TGPP" parameter, according to the TGPP classification model (step 1430). The expected TGPP reflects the expected rise of indoor temperature (in Fahrenheit degrees) during a predefined period, while the HVAC compressor is turned oft given the current environmental conditions (e.g.: current time of day and outdoor temperature).

FIG. 6 is a flow diagram depicting the functionality of the data analysis module 1500, according to some embodiments of the present invention. This module resides within the server, and is responsible for ascertaining whether a specific household is suspected to have inefficient thermal insulation.

The data analysis module 1500 obtains at least part of the following data in respect to each monitored household (step 1510):
  The "Period to Gain Predefined Temperature" (PGPT) (from the preprocessing module 1200);
  The Expected PGPT (from the PGPT Training module 1300);
  The "Temperature Gained during Predefined Period" (TGPP) (from the preprocessing module 1200); and
  The Expected TGPP (from the TGPP Training module 1400).

The data analysis module 1500 divides the actual PGPT (from the preprocessing module) by the expected PGPT (from the PGPT Training module 1300), per each monitored household. The quotient of this division is henceforth referred to as the household's "PGPT scoring ratio". (step 1520).

The data analysis module 1500 compares the PGPT scoring ratio of each monitored household with that of its peers (i.e. houses of similar profile parameters and residents profile parameters). Low PGPT scoring ratio (i.e. households that have gained the predefined temperature quicker than expected) in relation to peers indicates a condition of inefficient insulation (step 1530).

The data analysis module 1500 divides the actual TGPP (from the preprocessing module) by the expected TGPP (from the TGPP Training module 1400), per each monitored household. The quotient of this division is henceforth referred to as the household's "TGPP scoring ratio" (step 1540).

The data analysis module 1500 compares the TGPP scoring ratio of each monitored household with that of its peers (i.e. houses of similar profile parameters and residents profile parameters). High TGPP scoring ratio (i.e. households that have gained more heat than expected during a predefined period) in relation to peers indicates a condition of inefficient insulation (step 1550).

The data analysis module 1500 analyzes said comparisons, to identify conditions of suspected inefficient household thermal insulation (step 1560). For example:

The data analysis module 1500 may determine that a household exhibiting a TGPP scoring ratio percentile within its cluster that is above a predefined threshold is inefficiently insulated;

The data analysis module 1500 may determine that a household exhibiting a PGPT scoring ratio percentile within its cluster that is below a predefined threshold is inefficiently insulated; or Any combination of the above.

Figure 8:
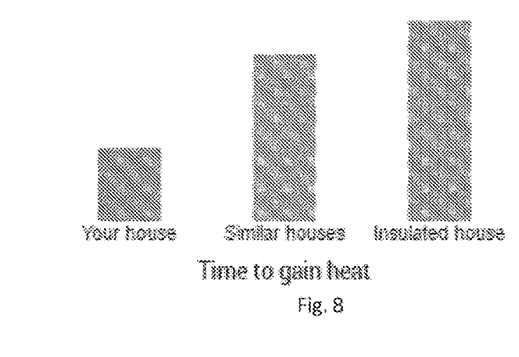
FIG. 8 presents an optional graphic report, accompanied by an alert to residents of poorly insulated households.

According to some embodiments, the data analysis module 1500 produces alerts to administrators and end users, notifying them of said suspected conditions of inefficient thermal insulation. Reference is now made to FIG. 8, which presents an optional graphic report, accompanied by an alert to residents of inefficiently insulated households. The report compares the following three bars (from left to right):

1. "Your house" presents the actual "Period to Gain Predefined Temperature" (PGPT) in the current environmental condition of a customer's household. It is the shortest bar and colored red to indicate a condition of suspected inefficient thermal insulation.

2. The "Similar houses" bar presents the Expected PGPT parameter, indicating that houses of similar household profile and residents' profile parameters are expected to demonstrate a more moderate increase of indoor temperature in the same environmental conditions, after the HVAC compressor has been turned off.

3. The "Insulated houses" bar presents the high-end of well insulated households of similar household profile and residents' profile parameters.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software ma y, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order, program storage devices readable by machine, tangibly embodying a program of instructions executable by the machine to perform any or all of the steps of any of the methods shown and described herein, in any suitable order, a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a process or/and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for automatic detection of inefficient household thermal insulation within a group of monitored households, implemented by a server and a plurality of household clients, wherein each of the server and the plurality of household clients comprises one or more processors, operatively coupled to non-transitory computer readable storage devices, on which are stored modules of instruction code, wherein execution of the instruction code by the one or more processors implements the following actions:
   acquiring data relating to each monitored household, including at least part of: environmental conditions, HVAC compressor activation time, HVAC thermostat convenience temperature settings, indoor and outdoor temperatures, household profile parameters, and household profile resident parameters;
   identifying periods of HVAC down-time, and determining the indoor temperature gained during the identified periods of HVAC down-time;
   extracting parameters of temperature gained, relating to a measured rate of the temperature gained during the HVAC down-time;
   training a machine learning algorithm, to create at least one classification model, wherein the monitored households are classified according to the acquired data and the extracted parameters of temperature gained during the HVAC down-time;
   using the at least one classification model to produce expected values for the parameters of temperature gained per each household, according to a household class membership;
   producing a ratio between the expected values for the parameters of temperature gained and measured values of the parameters of the temperature gained per the each monitored household;
   comparing the ratio per the each monitored household with ratios per peers, wherein the peers are houses of similar profile parameters and/or residents profile parameters; and
   determining, according to the comparison, whether a specific household is suspected to be inefficiently insulated.

2. The method of claim 1, further comprising the step of identifying an existence of an active unmonitored HVAC system within the monitored household.

3. The method of claim 1, wherein one of the extracted parameters of temperature gained, relating to a measured rate of the indoor temperature gained during the HVAC down-time is a Period to Gain a Predefined Temperature (PGPT).

4. The method of claim 3, further comprising the step of computing a PGPT scoring ratio by dividing measurement of an actual PGPT by expected PGPT, per the each monitored household and comparing the PGPT scoring ratio of the each household with the PGPT scoring ratio of the peers, wherein when the PGPT scoring ratio is lower in relation to the peers, a condition of inferior insulation is indicated.

5. The method of claim 1, wherein one of the extracted parameters of the temperature gained, relating to the measured rate of the indoor temperature gained during the HVAC down-time is a Temperature Gained during Predefined Period" (TGPP).

6. The method of claim 5, further comprising the steps of:
   computing a TGPP scoring ratio by dividing an actual TGPP by the expected TGPP, per the each monitored household; and
   comparing the TGPP scoring ratio of the each household with the TGPP scoring ratio of the peers, when the TGPP scoring ratio higher in relation to the peers, indicate a condition of inferior insulation is indicated.

7. The method of claim 1, wherein the HVAC down-time directly follows HVAC compressor turn-off, during which the indoor temperature has risen by a predefined temperature.

8. The method of claim 1, wherein the HVAC down-time is while the HVAC compressor is turned off, exceeding a predefined period.

9. The method of claim 1, further comprising the step of identifying an existence of active, unmonitored HVAC systems within the monitored household.

10. A system for automatic detection of inefficient household thermal insulation within a group of monitored households, comprising a server and a plurality of household clients, wherein:
   each of the server and the plurality of household clients comprises one or more processors, operatively coupled to non-transitory computer readable storage devices, on which are stored modules of instruction code, wherein execution of the instruction code by the one or more processors implements a function of the server and the plurality of household clients;
   the plurality of household clients are configured to acquire at least part of: indoor temperature, outdoor temperature, HVAC compressor activation time, HVAC thermostat convenience temperature settings, HVAC mode of operation, household profile parameters and household profile resident parameters;

the plurality of household clients are configured to convey the acquired data to the server;

the server further comprises a preprocessor, configured to identify periods of HVAC down-time, and determine the indoor temperature gained during the identified periods of HVAC down-time;

the preprocessor is further configured to extract parameters of temperature gained, relating to a measured rate of the indoor temperature gained during the HVAC down-time;

the server further comprises at least one trainer, configured to train a machine learning algorithm, to create at least one classification model, wherein the monitored households are classified according to the acquired data and the parameters of temperature gained;

the at least one trainer is further configured to use the at least one classification model to produce expected values for the parameters of temperature gained per each household, according to a household class membership;

the server further comprises a data analysis module, configured to: produce a ratio between the expected values for the parameters of the temperature gained and measured values of the parameters of the temperature gained per each monitored household;

to compare the ratio per the each monitored household with ratios per peers, wherein the peers are houses of similar profile parameters and/or residents profile parameters; and to determine, according to the comparison, whether a specific household is suspected to be inefficiently insulated.

11. The system of claim 10 wherein the preprocessor is further configured to extract indications regarding an existence of an unmonitored active HVAC system within the monitored household.

12. The system of claim 10, wherein one of the extracted parameters of the temperature gained, relating to the measured rate of the indoor temperature gained during the HVAC down-time is a Period to Gain a Predefined Temperature (PGPT).

13. The system of claim 10, wherein one of the extracted parameters of the temperature gained, relating to the measured rate of the indoor temperature gained during the HVAC down-time is a Temperature Gained during Predefined Period (TGPP).

* * * * *